March 25, 1969  E. R. SPEAKMAN  3,434,327
STRESS COINING
Filed Nov. 1, 1966  Sheet 1 of 2
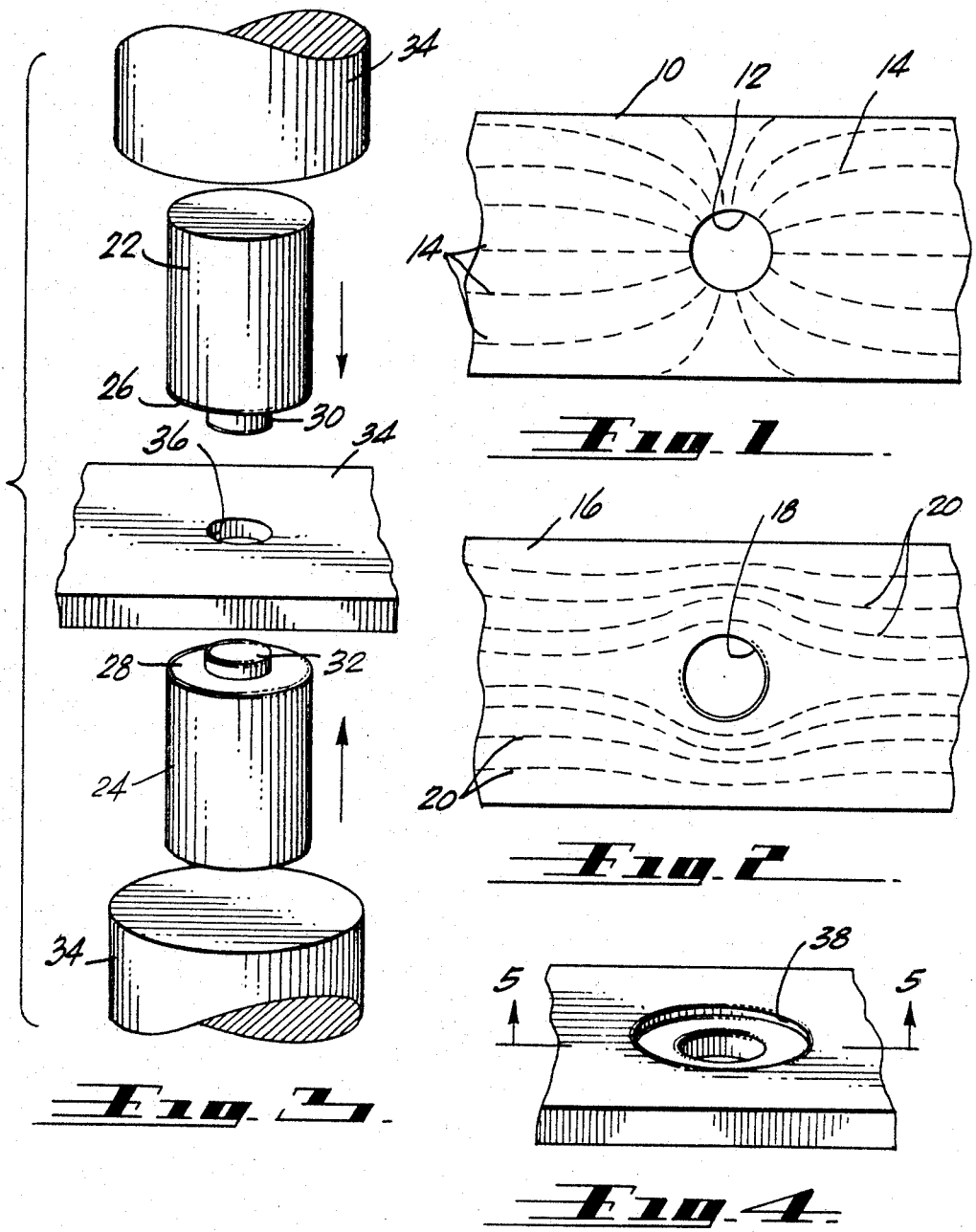
INVENTOR.
EUGENE R. SPEAKMAN
BY
AGENT March 25, 1969  E. R. SPEAKMAN  3,434,327
STRESS COINING Filed Nov. 1, 1966

INVENTOR.
EUGENE R. SPEAKMAN
BY
-AGENT-

United States Patent Office 3,434,327
Patented Mar. 25, 1969

3,434,327
STRESS COINING
Eugene R. Speakman, Fullerton, Calif., assignor, by mesne assignments, to McDonnell Douglas Corporation, Santa Monica, Calif., a corporation of Maryland
Filed Nov. 1, 1966, Ser. No. 591,189
Int. Cl. B21d 31/00; B21c 37/02; B23p 11/02
U.S. Cl. 72—377                                                                      4 Claims

ABSTRACT OF THE DISCLOSURE

A method for stress coining the aperture of a metallic structural member wherein the entire longitudinal length of the aperture is cold-worked causing the aperture wall material to become plastic and then permitting the wall material to rebound into the elastic state assuming a residual compression stress.

---

This invention relates to a means of increasing the fatigue endurance limit of an apertured structural member of metallic characteristics. More specifically, this invention relates to a method of cold working the wall material of the aperture to eliminate surface cracks and undesirable tensile stress, and also creating a residual compressive stress to counteract fatigue tensile stresses which tend to cause premature failure of the structural member.

In many types of structural members, it is a "must" to know what force can be applied to the member before the member will fail (or yield). Such yield points can be easily calculated when the members are under static load conditions, however, when a member is constantly subjected to a fluctuating movement where the fluctuations establish some sort of a definite pattern, a different kind of failure is applicable; such being defined as a fatigue failure. The nature of the fatigue failure is a gradual or progressive fracture. The fracture starts at some point in the structural member at which the stress is much larger than was calculated. This high localized stress causes a small crack which gradually separates as the flexing movement is repeated until the entire member ruptures without measurable yielding. It is well known in this type of failure that the inclusion of an aperture therein, such as a drilled hole, for the insertion of a fastening member, creates an area for the derivation of a high localized stress. It is desirable to modify the aperture in some manner whereby the high localized stress can be either substantially reduced or eliminated. For this purpose the method of this invention is specifically applicable.

In aircraft, during flight, the wing structures and the fuselage structural members are subjected constantly to this type of fatigue failure. The wind turbulence coupled with the aircraft maneuvers cause a cyclic movement of practically all the structural supporting members within the aircraft. As such members usually contain apertures therein for the insertion of fastening means, the high localized stress created thereby greatly compounds the fatigue failure problem.

Heretofore, there has been many attempts to solve the problem of fatigue failure. The mere inclusion of a screw slightly increases the fatigue endurance limit. The inclusion of a lockbolt or rivet slightly improves the fatigue characteristic over the application of a screw. However, still greater advances could be achieved in the area of fatigue failure.

A pioneer method to increase the fatigue and endurance limit of structural members is described in Patent No. 3,110,086. The subject matter defined in this patent will hereinafter be referred to as ring coining. Basically, ring coining comprises the forming of a thin groove spaced from and around an aperture in the structural member. The groove is formed as by stamping thereby cold working the material metal and creating a residual compressive stress around the exterior of the hole. Such compressive stress tends to ward off or counteract any stresses which tend to cause failure of the member. In this manner, the fatigue endurance of the structural member can be increased as a greater value of a fatigue failure stress is required to overcome the residual compressive stress and to thereupon create yielding of the structural members. Although this type of coining has been of great advantage for the past number of years, such still does not solve the problem of decreasing the high localized stress but merely creates a compressive stress which functions as a "fence" around the area of the high localized stress.

Broadly, this invention relates to a method which results in metallic material in the vicinity in the aperture or area of high localized stress to be compressed to such a point as to cause the material to exceed the elastic limit and become plastic. The force required to accomplish such must be sufficient to cause substantial material deformation within the plastic range of the material. Upon release of the force, the material will rebound back into the elastic range with the result that a residual compressive tangential stress is obtained in the area of the aperture which tends to counteract any stress which might cause failure of the structural member. The effect of the applied force also causes the elimination of any surface cracks or other breaks in the material due to the drilling, reaming, or other forming operation of the aperture. Also, any undesirable tensile stresses which are due to such aperture forming methods are substantially reduced or eliminated due to the method of this invention. The material displacement to effect the operation of this invention must be within a certain range in order to accomplish the results of this invention. The force, if not sufficient, will not cause the elimination of the surface stresses and create a sufficient residual compressive stress. If the force is too great, the rebound of the material will be slight, therefore not creating the maximum value of residual compressive stress in the wall of the aperture. It has been found through experimentation that a rebound of approximately one-half the value of the initial material displacement is satisfactory.

Although the ring coining method has been satisfactory in the past, certain disadvantages are apparent which are not apparent in the method of this invention: First, the fatigue failure always initiates in the aperture. Ring coining spaces the effective groove away from the aperture perimeter which does not always stop fatigue cracks. Second, ring coining cannot be effected in the field. The apparatus to complete the ring coin method is so large as to prevent portability. Third, dies required to effect the ring coining are extremely expensive. Such high precision apparatus is not required in applying the method of this invention. Fourth, some structural members, the groove of the ring coining method is not desirable because of appearance. The coining method of this invention completely obviates the employment of any spaced exterior marking. Fifth, the application of ring coining upon material of a thin gage tends to crack the grain structure, and on a substantially thick material ring coining does not sufficiently pre-stress, thereby losing its effectiveness. Sixth, ring coining can only be performed in a single thickness of material. Many times it is desirable to effect the coining operation after final assembly upon multiple layers of material. The coining method of this invention overcomes this single layer difficulty.

The advantages of the stress coining method of this invention over the ring coining method is as follows: First, constant diameter apertures are produced with a mirror-like finish. Second, the apparatus effecting the method is constructed for easy portability and tool reusability. Third, a material of thinner gage which has been operated upon by the method of this invention obtains the desired strength requirements of a heavier gage piece of material which has not employed the use of this invention. Fourth, no need to employ heavy and expensive interference fasteners to increase fatigue life. Fifth, it is possible to rework partially yielded structural members with this invention, thereby reinstating the structural member to its original fatigue and endurance limit.

The above introduction states the general advantages of the invention and presents a brief summary of the problems for which the invention provides a solution. Further objects of the invention, and a better understanding of the details thereof, may be obtained in the annexed description taken in connection with the drawings in which similar reference numerals indicate similar parts and in which:

FIGURE 1 is a view depicting a stress pattern of an apertured structural member showing lines of stress therein, the aperture not having been coined by the method of this invention;

FIG. 2 is a view similar to FIG. 1 showing the stress pattern of the member where the aperture has been coined by the method of this invention;

FIG. 3 is an exploded pictorial view showing apparatus to effect one embodiment of the coining of this invention;

FIG. 8 is a fatigue stress diagram depicting graphically the improvement of this invention over the prior art methods.

Figure 4:
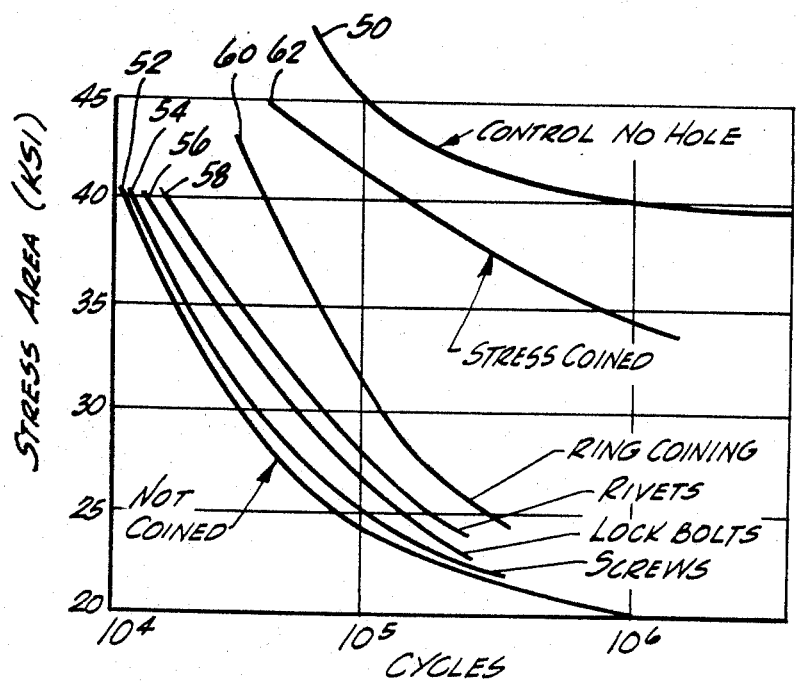
FIG. 4 is a pictorial view showing the resultant coined aperture accomplished by the apparatus of FIG. 3.

The stress diagram of FIGS. 1 and 2 are strictly for explanation purposes only and it is not for showing the novelty of the invention. In FIG. 1 a structural member 10 is shown having an aperture 12 formed therein. The aperture 12 can be formed by any one of many conventional ways as by drilling or reaming. Lines 14 represent a stress pattern of the material in conjunction with the aperture 12. It is clearly shown that the lines of stress 14 tend to converge toward the center of the aperture 12, therefore, it should be obvious that as force is applied to the structural member 10, the magnitude of the force will be concentrated upon the aperture 12. In other words, the weakest portion of the member 10 is the aperture 12.

In FIG. 2 is a stress diagram similar to FIG. 1 in which a structural member is shown having an aperture 18. Aperture 18 has been stress coined by the method of this invention. Stress lines 20 depict the stress pattern of the member 16 showing the effect of the stress coining of this invention as compared to FIG. 1. It is shown that the lines of stress 20 do not converge on the aperture 18 as in FIG. 1 and tend to flow around the aperture similar to an aerodynamic flow pattern. As the lines of stress are not concentrated at any single point, there is "no weakest link" and the structural member 16 will function substantially as a non-apertured member.

Figure 5:
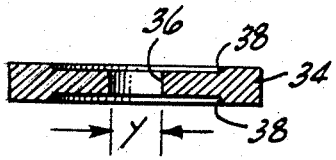
FIG. 5 is a cross sectional side view taken along line 5—5 of FIG. 4.
Figure 6:
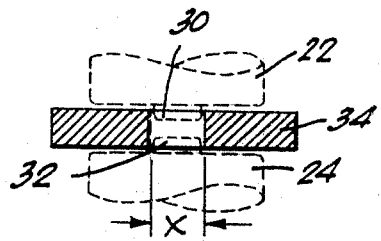
FIG. 6 is a side view similar to FIG. 5 showing the application of the coining apparatus of FIG. 3.

In FIG. 3 an apparatus is shown to effect one form of the stress coining of this invention. Dies 22 and 24 are shown having circular bases 26 and 28, respectively. Located on each base 26 and 28 is a cylindrical projection 30 and 32, respectively. Dies 22 and 24 are to be operated in an in-line relationship by actuating structure 34, structure 34 tending to squeeze the dies 22 and 24 together. Projections 30 and 32 are to be established in a facing relationship. Structural member 34, having an aperture 36 therein, is shown located intermediate the dies 22 and 24. The cylindrical projections 30 and 32 are adapted to coact with the aperture 36 during the coining operation. The coining operation of this embodiment is the squeezing of the dies 22 and 24 together by the actuating element 34 until predetermined permanent deformation of the structural member 34 is effected resulting in pads 38 being located on opposite sides of the structural member 34, as shown in FIGS. 4 and 5. Obviously the pads 38 are formed by the base 26 and 28 which cause a squeezing action on the material adjacent the aperture 36. The projections 30 and 32 serve two functions; first, strictly for facilitating alignment of the dies 22 and 24, and second, as the material is squeezed together the projections 30 and 32 operate as a stop to determine the minimum diameter of the aperture 36. Upon release of the dies 22 and 24, the material of the structural member 34 surrounding the aperture 36 rebounds a certain amount. The amount of the rebound is directly proportional to the squeezing of the material around the aperture 36. It is inherent to permanent deformation that the material exceed the elastic limit and penetrate the plastic state of the material. It has been found through experimentation that the amount of rebound necessary to accomplish the objective of this invention is to be approximately one-half the value of the initial displacement. This value of rebound will give the maximum value of residual compressive force in the material surrounding the aperture. The effect of the transcending of the material into the plastic state causes an elimination of all small surface cracks which may be due to the hole forming operation. Also, any undesirable tensile stress created by the hole forming operation is removed.

The depth of the pad 38 is variable with the type of material to which the coining method is applied. Usually, a pad of .004 to .006 is found to be satisfactory for most materials. The pad depth also depends on the amount of pressure desired to cause the pad formation. The specific values are not necessary to be related here, but can be easily determined through experimentation.

Figure 7:
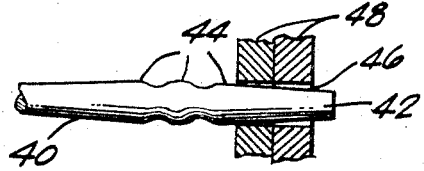
FIG. 7 is a pictorial view showing an apparatus which is to be employed to effect the second embodiment of the coining method of this invention.

In FIG. 7 there is depicted a second form of the invention in which a tool 40 having a tapered end 42 and a rib 44 is shown. Tool 40 is to be forcibly inserted through aperture 46 of multiple layers of material 48. Aperture 46 is to be formed slightly undersize. Rib portion 44 of the tool 40 causes the material around the aperture 46 to expand to such a degree as to cause the material to transcend into the plastic state, past the elastic limit of the material. Again the rebound, as hereinbefore mentioned, has been calculated experimentally to be in the order of one-half, of the amount of the aperture expansion. Because of friction it is necessary that the tool 40 be heavily lubricated. The material must be only cold worked as it is necessary to eliminate the expansion of the material due to the frictional heat energy. The heat energy will reduce or substantially eliminate the residual compressive stress which is to remain in the material after the coining operation.

In FIG. 8, there is shown a fatigue stress diagram of a structural member which has been operated on by the method of this invention as compared to previously known methods. The vertical coordinate shows the force per unit area applied to the structural member and the horizontal coordinate represents the number of cyclic fluctuations before failure of the structural member. Line 50 represents the fatigue characteristics of the structural member without the forming of an aperture therein. Line 52 represents the material specimen in which an unaffected aperture is found therein. Therefore, line 52 represents the worst situation as to fatigue failure. Lines 54, 56 and 58 show the effect of the inclusion of screws, lock bolts and rivets, respectively, as being located in the material aperture. It is noted that a slight improvement of each is apparent as to fatigue failure. The effect of ring coining is shown as line 60 which is a substantial improvement over the fastening means as shown in lines 54, 56, and 58. The effect of stress coining is shown as line 62. A substantial improvement over the ring coining of line 60 being readily apparent. Therefore, this invention causes the apertured structural member to approach the nearest to the fatigue characteristics of the non-apertured member depicted as line 50, such being the maximum.

It is necessary that the coining operation shown in FIG. 7 require a higher tolerance with respect to aperture size than the pad type of coining shown in FIG. 3. Therefore, the pad type of coining is employed on apertures which are not of high precision, the aperture after the coining operation being of a more precise tolerance. Comparing the two apparatuses to affect the method of this invention, the following advantages and disadvantages are noted. To coin as in FIG. 7 less apparatus is required to effect the operation than by the apparatus of FIG. 3. The form of FIG. 3 has a wider range of applicability, but requires more equipment to effect the coining operation. The form of FIG. 7 as a more limited range of applicability yet requires less equipment to effect the coining operation.

It will be obvious to those skilled in the art that various changes may be made in the invention without departing from the spirit and scope thereof, and therefore, the invention is not limited to that which is illustrated in the drawings and described in the specification, but only as indicated in the accompanying claims.

I claim:
1. A method of increasing the fatigue-strength of a metallic structural member having an aperture therein, comprising:
   cold-working the surfaces of the aperture to cause the material directly adjacent the aperture to exceed the material's elastic limit and substantially transcend within the plastic state of the material;
   allowing the displaced material to rebound approximately one-half the amount of the material displacement.
2. The method of claim 1 wherein:
   said step of cold-working the aperture comprises a decreasing of the aperture dimensions.
3. The method of claim 1 wherein:
   said step of cold working the aperture comprises an increasing of the aperture dimensions.
4. A method of minimizing stress concentration about the periphery of a wall of an aperture in a metallic member, comprising:
   forcibly squeezing the material forming the wall of the aperture in an axial direction;
   displacing said material radially a predetermined amount which effects a decrease in the dimensions of said aperture;
   causing said material to exceed its elastic limit and become plastic; and
   allowing rebound of said material to approximately one-half of the value of the material displacement value thereby resulting in a permanent deformation of said material.

References Cited

UNITED STATES PATENTS

| | | | |
|---|---|---|---|
| 2,438,837 | 3/1948 | Archer et al. | 72—374 |
| 2,848,805 | 8/1958 | Brink | 72—324 |
| 3,110,086 | 11/1963 | Phillips | 72—377 |
| 3,145,455 | 8/1964 | Zaleske | 72—376 |
| 3,270,410 | 9/1966 | Salter et al. | 72—370 |
| 3,354,689 | 11/1967 | Tirone | 72—470 |

CHARLES W. LANHAM, *Primary Examiner.*

LOWELL A. LARSON, *Assistant Examiner.*

U.S. Cl. X.R.

29—446; 72—379